Patented June 26, 1923.

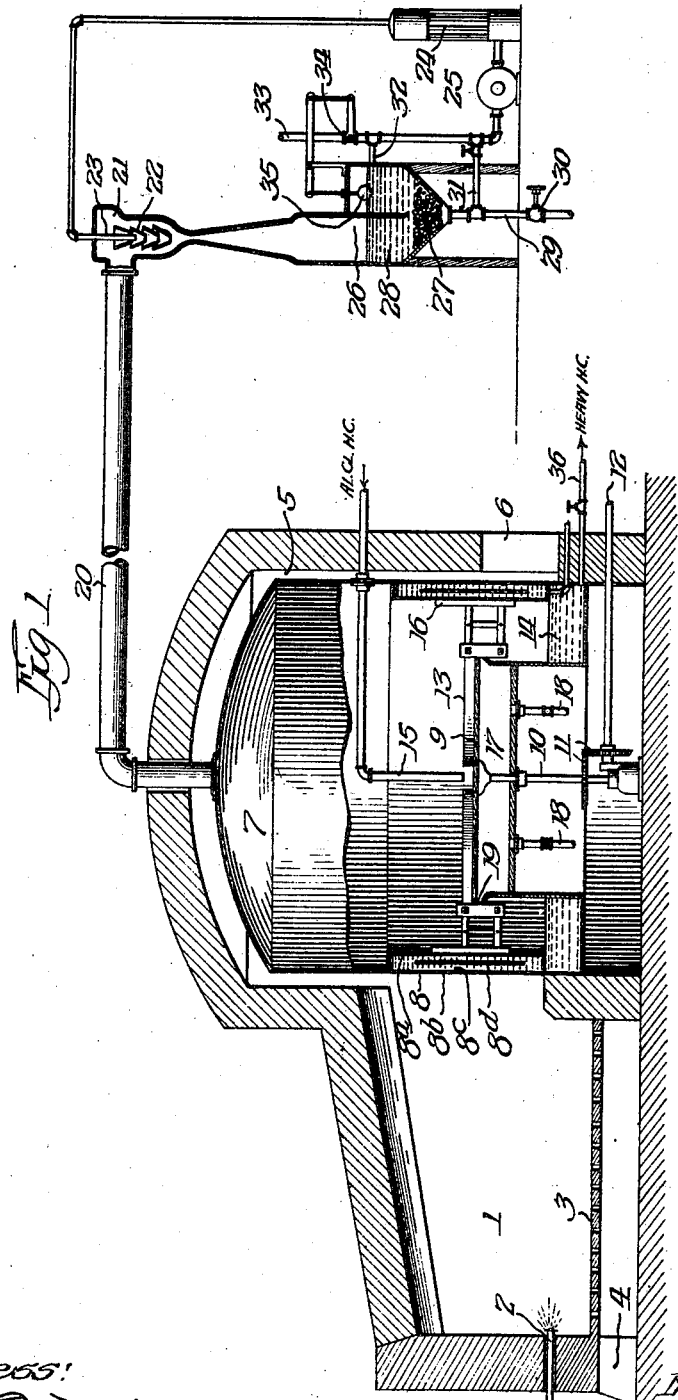

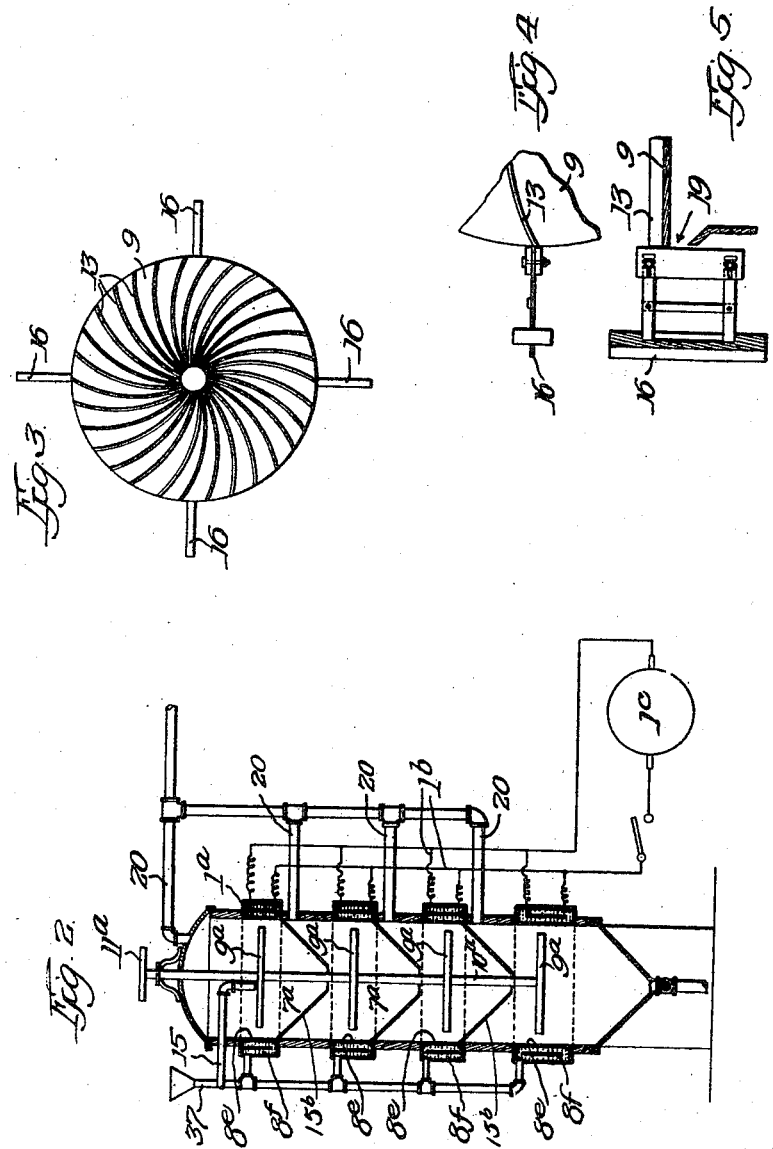

1,460,110

UNITED STATES PATENT OFFICE.

ERNEST V. OWEN, OF CHICAGO, ILLINOIS, ASSIGNOR TO THE HOOVER COMPANY, OF CHICAGO, ILLINOIS, A CORPORATION OF ILLINOIS.

PROCESS FOR RECOVERING CATALYST FROM CATALYSIS RESIDUE.

Application filed March 3, 1922. Serial No. 540,768.

*To all whom it may concern:*

Be it known that I, ERNEST V. OWEN, a citizen of the United States, residing at Chicago, in the county of Cook and State of Illinois, have invented certain new and useful Improvements in Processes for Recovering Catalyst from Catalysis Residue, of which the following is a specification.

This invention relates to a process for separating fluid substances having different boiling points. The primary object of the invention is to separate the constituents of a liquid mixture by contacting said liquid mixture, in a finely divided state, with a heated surface which is maintained at such a temperature as to volatilize one or more of the constituents while the other or others of the constituents remain in a liquid state. While capable of general application, the invention is designed more particularly for the separation and recovery of aluminum chloride from heavy hydrocarbons with which it may be associated, as in a spent or partially spent catalyst.

In order that the invention may be fully understood, an illustrative procedure embodying the same, together with two alternative forms of apparatus employed in practicing the process, will be described in detail, reference being had to the accompanying drawings, in which—

Figure 1 is a vertical section through one form of apparatus.

Figure 2 is a vertical section through a modified construction of recovery chamber.

Figure 3 is a detail view showing in plan the construction of the centrifugal spraying disc.

Figures 4 and 5 are detail views showing in plan view and side elevation the construction of the scrapers.

Referring to Figures 1, 3, 4 and 5, 1 represents the furnace supplied with fuel, preferably in fluid form, through the medium of the pipe 2 and receiving its combustion supporting medium air, through a grating 3, from a flue 4. Within the heating chamber 5 through which products of the combustion pass in reaching the outlet port 6, is located a recovery chamber 7 of plate metal, which is heated by the gases from the furnace to a temperature that induces separation of the lower boiling constituents of the liquid, for instance, aluminum chloride from hydrocarbon, which has become heavy by reason of its spent or partially spent condition resulting from catalytic action in the recovery of gasoline. This recovery chamber is constructed with a heating zone 8 in position to receive direct impingement of the gases from the combustion chamber 1 and in order that the liquid, the constituents of which are to be separated, may be brought into intimate heating relation with this heating zone, a revolving disc 9 is mounted centrally within the chamber 7, upon a shaft 10 which is driven through gear wheels 11, by a shaft 12. Disc 9 is equipped with upstanding vanes 13, the general direction of which is radial, although the exact form is preferably curved to lend additional force to the peripheral delivery of the fluid, and the action of the disc so equipped is violently to project, in finely subdivided form, liquid to be separated, and cause said liquid to impinge in a fine spray against the inner wall of the heating zone 8 whereby the more volatile or lower boiling ingredient is volatilized and released into the upper portion of the chamber 7 while the heavier and higher boiling ingredient or ingredients pass down into the collecting trough 14 at the bottom of chamber 7. The liquid sprayed is delivered centrally upon the centrifugal disc 9, by a pipe 15 leading from any suitable source of the liquid.

In order to prevent the liquid from coking or caking upon the heating surface of the zone 8, the latter is constructed with an inner wall $8^a$ spaced from the outer wall $8^b$ to develop a heating bath $8^c$ which will temper the heating effect and prevent the fluid to be separated from coming into direct contact with the wall against which the products of combustion impinge. In order to keep the inner wall $8^a$ of the heating zone up to the desired temperature, the annular wall $8^d$ is suspended in the bath $8^c$ intermediate of these walls $8^a$ and $8^b$, and with sufficient vertical dimension to cause circulation of the liquid of the bath by the rising of the portion adjacent to the outer wall $8^b$ under the increased heat absorbed from the impinging products of combustion and the down flow of the liquid of the bath on the inner side of said annular wall. As a suitable fluid for the bath $8^c$, I prefer to use lead which assumes a molten state under the temperature at which the process is worked and which will circulate in the manner described.

In order to keep the inner impacting surface of the zone 8 free to receive the mixture to be separated, the revolving disc 9 is equipped with scrapers 16 of suitable number, as for instance four as suggested in Figure 3, and these embrace, in their scraping action, the rear of the wall which is impinged against by the mixture being sprayed. As will be seen in Figures 4 and 5, the scrapers 16 are mounted upon the disc 9 with some freedom of radial movement so that centrifugal force develops intimate scraping contact.

Beneath the disc 9 is a gas chamber 17 which receives superheated fixed hydrocarbon gases through pipes 18 and discharges said gases through the passageways 19 (see Figure 5) and upward through the spray or veil of finely subdivided mixture which is being given off from the periphery of the disc, into the upper portion of the chamber 7 whence they escape with the volatilized constituent of the mixture that is being treated. Other gases, such as carbon dioxide, may be used.

From the chamber 7 the volatilized constituent, for instance, aluminum chloride, together with fixed hydrocarbon gases, and any light hydrocarbon that may have passed off in the mixture, escape through the overhead pipe 20 into the absorption chamber 21 where they are drawn into the series of concentric nozzles 22 of the combining apparatus by a blast of fresh liquid, for instance, absorbent naphtha, at a relatively low temperature, delivered through pipe 23 from a cooler 24 by a pump 25. The combined liquid from pipe 23 and now condensed vapors from pipe 20, pass downward into a settling or separation chamber 26 where the combined product separates as at 27 and the surplus condensing liquid remains in an upper stratum 28. The combined product from the stratum 27 may be drawn off through a pipe 29 controlled by valve 30 to a place of use or to a tank for storage, or it may be by-passed through a pipe 31 to the pump 25 and passed through the cooler 24 back to the combining apparatus 22 to take up more of the volatile constituents from the recovery chamber 7 in order to make a richer mixture. The uncombined condensing liquid 28 which accumulates in the chamber 26, passes through pipe 32 to the pump 25 and is returned through cooler 24 to the combining apparatus 22 for the production of more mixture. In order to keep up the supply of condensing liquid in the chamber 26, the pipe 33 is led from some suitable source of liquid, and connected through a valve 34 with the pipe 32, and valve 34 is controlled by a float 35 in the chamber 26 so that the supply of the condensing liquid is kept up to the desired level.

Heavy hydrocarbon which settles in the trough 14 can be withdrawn through a pipe 36 and disposed of in any desirable manner or for any useful purpose.

According to Figure 2, a plurality of recovery chambers $7^a$ are provided with centrifugal discs $9^a$ mounted upon a common shaft $10^a$ adapted to be revolved by a pulley $11^a$. By these discs $9^a$, mixture introduced through pipe 15 is repeatedly discharged in thin veils against heating zones $8^e$ containing circulating fluid baths, $8^f$ operated in principle like the bath $8^c$ already described in that they are kept at a temperature which volatilizes the constituent or constituents to be set free, but by means of electrical heating grids $1^a$ receiving current through circuit $1^b$ from any suitable source $1^c$ of electricity. The material of the baths $8^f$ supplied through pipe 37 is preferably a high boiling point hydrocarbon oil or a hydrocarbon with a much higher boiling point than that of any of the ingredients to be volatilized. Between the centrifugal discs $9^a$ are funnels $15^b$ which collect the non-volatilized portion of the mixture from each antecedent disc and deliver the same centrally upon the succeeding disc, with the result that the mixture is treated to a plurality of recovery operations each corresponding in principle to that described with reference to Figure 1 and thus insuring more complete recovery of the valuable ingredient in the mixture which will escape through the pipes 20 and be dealt with as already described in connection with Figure 1.

From the foregoing description it will be seen that the mixture of ingredients to be separated by a volatilization of one or more of such ingredients to the exclusion of another or others thereof, is forcibly impinged on a hot surface maintained at a temperature above that which will induce volatilization of the ingredient or ingredients to be set free, and below the temperature of volatilization of the ingredient or ingredients to be left behind; that in impinging the mixture against the hot surface; the mixture is spread out into a very thin sheath or veil which is greatly attenuated or subdivided so that all parts thereof are brought into efficient heating relation with the hot surface; that for the purpose of superinducing separation of the ingredients that are at the temperature at which they become volatile, a vehicle of hot gas, of a quality that cannot vitiate the ingredients to be recovered, is caused to pass transversely through the thin veil of projected mixture and to pass off with the released volatiles in a manner to assist their escape; and that the non-volatile ingredient or ingredients of the mixture is constantly removed from the hot surface so as to leave the latter free and unobstructed for the reception of the oncoming charge of fresh mixture.

I claim:

1. The improvement in the art of recovering aluminum chloride from hydrocarbon with which it has combined in the process of catalyzation, which consists in impinging the mixture of hydrocarbon and aluminum chloride while still in a fluid state, against a surface maintained at a temperature sufficient to volatilize the aluminum chloride while permitting hydrocarbon to settle out, and recovering the volatile thus released.

2. The improvement in the art of recovering aluminum chloride from hydrocarbon with which it has combined in the process of catalyzation, which consists in impinging the mixture of hydrocarbon and aluminum chloride, while still in a fluid state, against a surface maintained at a temperature sufficient to volatilize the aluminum chloride and low boiling hydrocarbons while permitting hydrocarbon to settle out, and recovering the volatiles thus released.

3. The improvement in the art of recovering aluminum chloride from hydrocarbon with which it has combined in the process of catalyzation, which consists in impinging the mixture of hydrocarbon and aluminum chloride, while still in a fluid state and in the form of a finely divided spray, against a surface maintained at a temperature sufficient to volatilize the aluminum chloride while permitting hydrocarbon to settle out, and recovering the volatile thus released.

4. The improvement in the art of separating aluminum chloride from aluminum chloride hydrocarbon which consists in delivering the aluminum chloride hydrocarbon into impingement against a surface heated to a temperature that will release the aluminum chloride by sublimation but leave behind heavy hydrocarbon, and recovering the volatile so released.

5. The improvement in the art of separating aluminum chloride from the aluminum chloride hydrocarbon which consists in delivering the aluminum chloride hydrocarbon in the form of a thin spray into impingement against a surface heated to a temperature that will release the aluminum chloride by sublimation but leave behind heavy hydrocarbon, and recovering the volatile so released.

6. The improvement in the art of separating aluminum chloride from aluminum chloride hydrocarbon which consists in delivering the aluminum chloride hydrocarbon into impingement against a surface heated to a temperature that will release the aluminum chloride by sublimation but leave behind heavy hydrocarbon, simultaneously passing hot gas in relation to the aluminum chloride hydrocarbon that will enable it to assist in releasing the aluminum chloride, and recovering the volatile so released.

7. The improvement in the art of separating aluminum chloride from aluminum chloride hydrocarbon which consists in delivering the aluminum chloride hydrocarbon into impingement against a surface heated to a temperature that will release the aluminum chloride by sublimation but leave behind heavy hydrocarbon, simultaneously passing through said thin spray of aluminum chloride hydrocarbon, hot gas adapted to assist in releasing the aluminum chloride, and recovering the volatile so released.

8. The improvement in the art of recovering aluminum chloride from spent or partially spent aluminum chloride hydrocarbon catalyst which consists in delivering said catalyst in the form of a spray into impingement against a surface heated to a degree that, during the interim of contact, heats aluminum chloride and low boiling hydrocarbon to the vapor point, and leaves high boiling hydrocarbon in liquid form, and recovering the resultant volatiles.

9. The improvement in the art of regenerating aluminum chloride hydrocarbon which consists in delivering spent or partially spent aluminum chloride hydrocarbon catalyst in the form of a thin spray, into impingement against a surface at a temperature sufficient to release the aluminum chloride, together with low boiling hydrocarbon, and leave behind heavy hydrocarbon, in the form of liquid, and passing the volatiles thus released into absorption relation to a light hydrocarbon liquid.

10. The improvement in the art of regenerating aluminum chloride hydrocarbon which consists in delivering spent or partially spent aluminum chloride hydrocarbon catalyst, in the form of a thin spray, against a surface heated to a temperature that releases the aluminum chloride and low boiling hydrocarbon from heavy hydrocarbon, simultaneously passing through said spray hot hydrocarbon gas, and then collecting the volatilized aluminum chloride, light hydrocarbon and hydrocarbon gas, and subjecting them to the absorbing action of liquid hydrocarbon.

Signed at Chicago, Illinois, this 1st day of March, 1922.

ERNEST V. OWEN.